Figure 1:
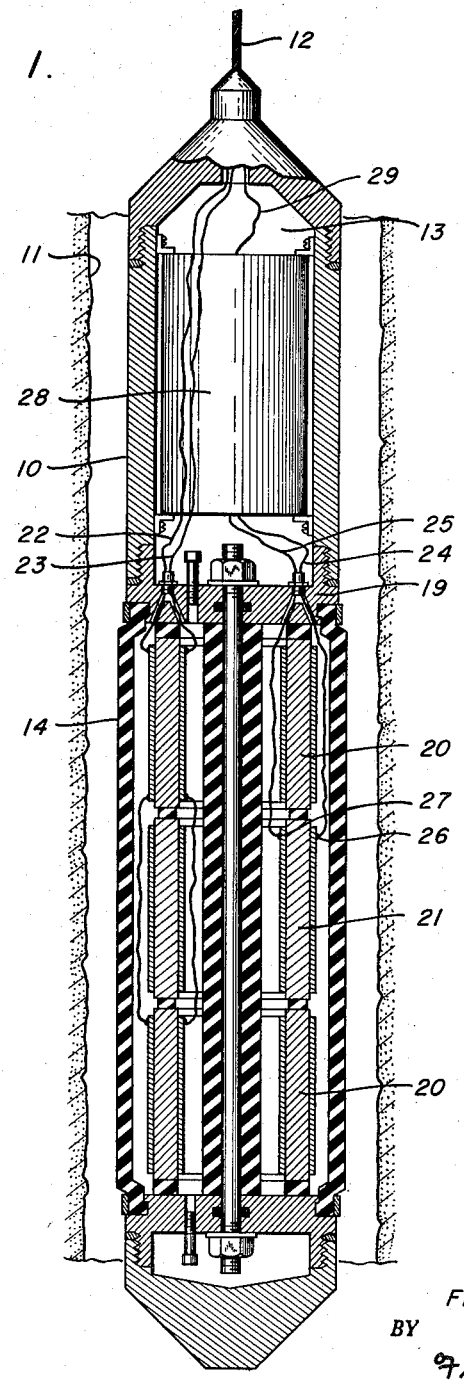

Nov. 3, 1959  F. N. TULLOS  2,911,487
AMPLIFYING SYSTEM
Filed Dec. 7, 1955  2 Sheets-Sheet 1

INVENTOR.
Frank N. Tullos,
BY
*Frank S. Troidl*
ATTORNEY.

INVENTOR.
Frank N. Tullos,
BY
Frank S. Troidl
ATTORNEY.

United States Patent Office 2,911,487
Patented Nov. 3, 1959

2,911,487

AMPLIFYING SYSTEM

Frank N. Tullos, Houston, Tex., assignor, by mesne assignments, to Jersey Production Research Company, Tulsa, Okla., a corporation of Delaware Application December 7, 1955, Serial No. 551,642

2 Claims. (Cl. 179—171)

This invention relates to a new and useful electrical circuit for increasing the percentage variation of an electrical signal which has a very small percentage variation. More particularly, this invention relates to an amplifying system that is particularly adapted to receive a varying alternating current signal which is small in magnitude, perhaps of the order of less than one volt, and increasing the percentage variation of the signal while at the same time amplifying the signal preparatory to transmitting the signal over a distance.

Electrical signals are often used for transmitting valuable information. For some uses, the information depends upon the change in magnitude of the voltage of the signal transmitted. However, if the percentage variation of the signal is small, for example, of the order of 1 to 2 percent, and the signal must be transmitted over a great distance, for example, as much as 2 to 4 miles, the noise of the cable through which the signal is being generated is sufficiently great to obscure the slight variation in the signal. It is necessary, therefore, under the foregoing circumstances, to increase the percentage variation of the detected signals prior to transmitting said signals over the cables. The variation in voltage must be at least of the order of a few volts in order to override the noise of the cable.

Under some circumstances, high amplification of the varying electrical signals is sufficient to obtain the required variation of a few volts. However, the amount of amplification which can be obtained is limited by the saturation point of the amplifying tube being utilized to amplify the signal prior to the transmission of the signal through the cable. For example, many amplifying tubes are limited to a 50 volt output before saturation. If the original signal varies, for example, from .49 to .50 volt, the highest possible amplification would be 100 before the tube reaches its saturation point of 50 volts. However, even amplifying the original signal 100 times would not produce a voltage variation of the required two or more volts. For some applications, such as in the transmission of electrical signals above the earth's surface, a plurality of amplifying stations may be located along the lines; however, in other applications, such as where a signal is being generated from below the surface of the earth, as is the case in the well logging tools conventionally utilized in the petroleum industry, it is impractical, if not impossible, to locate a plurality of amplifying stages along the well logging cable which may extend for as much as 2 to 4 miles below the surface of the earth.

An electrical amplifying system that keeps the voltage below the saturation point of the amplifying tube and increases the percentage variation of a signal small in magnitude, which does not vary by a very large percentage, is highly desirable.

It is an object, therefore, of my new and useful invention to provide an amplifying system which includes therein a means for increasing the percentage variation of an electrical signal.

Briefly described, my new system for amplifying an electrical signal includes a pair of electron tubes which have a resistor common to their anodes. The grid of one of the electron tubes is adapted to receive the varying electrical signal. The grid of the other electron tube is adapted to receive an electrical signal which is of reversed phase and of a different amplitude from the electrical signal to be amplified. Since the anodes of said electron tubes have a common resistor, the change in voltage at the anodes occasioned by the receipt of the electrical signal at the grid of the first electron tube and the electrical signal of reversed phase at the grid of the second electron tube are combined to present an output which varies by a much higher percentage than the variation of the original electric signal. The output from the anodes is amplified and transmitted to the receiving point.

Figure 2:
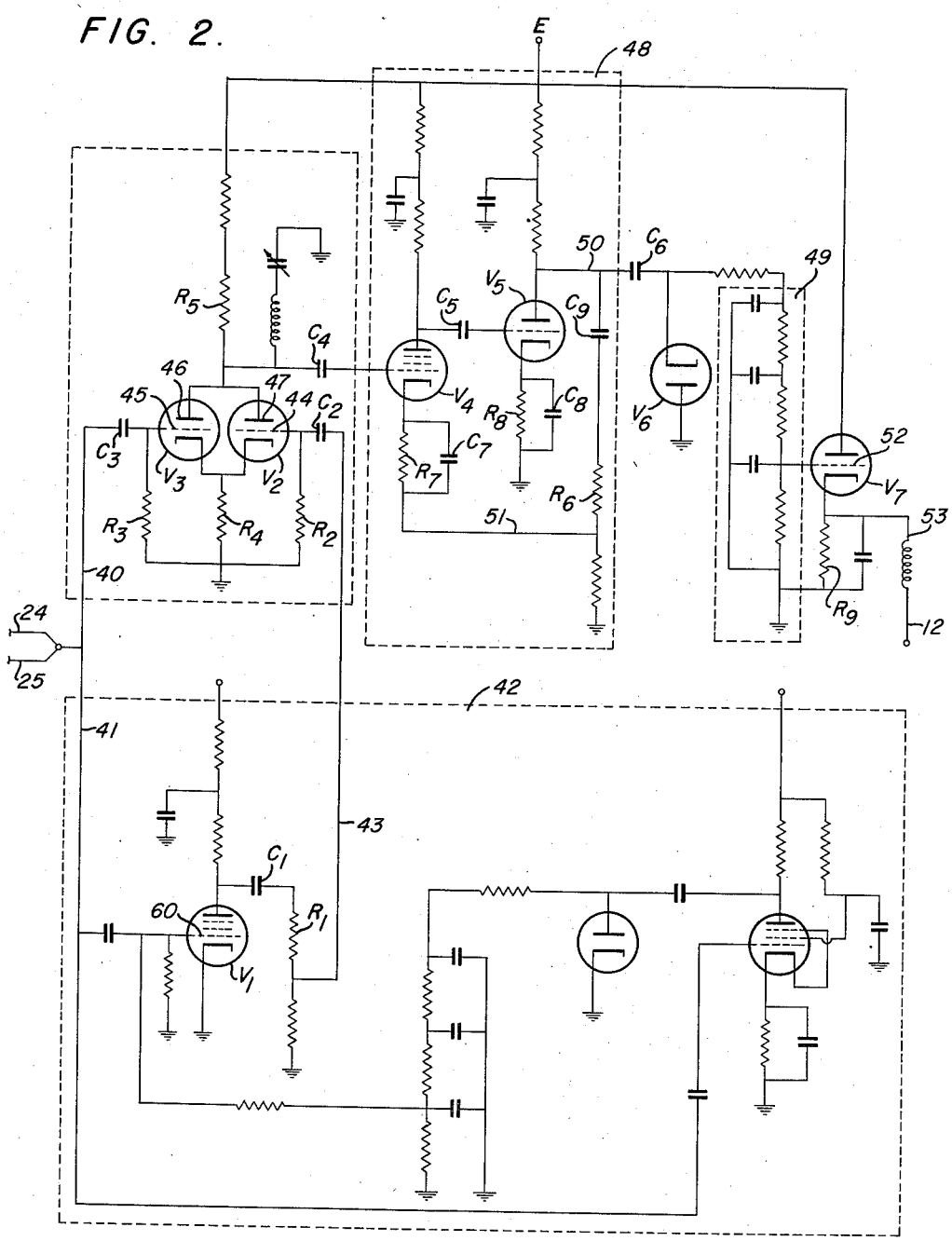

Other objects and a fuller understanding of the invention may be had by referring to the following description and claims, taken in conjunction with the accompanying drawings in which:

Fig. 1 is an elevational sectional view showing a well logging system utilized for acoustic impedance measurements and for which my new amplifying system has particular utility; and Fig. 2 is a schematic view of my new amplifying system indicated schematically in Fig. 1.

Referring to the drawings and more particularly to Fig. 1, a housing 10 is shown lowered into a borehole 11. Connected to the housing 10 is a cable 12 which is utilized to raise and lower the housing 10. The cable 12 also contains electrical conductors for transmitting electrical signals to the earth's surface, where they are recorded. Located within the housing 10 is an upper section 13 and a lower section 14 with sections 13 and 14 being separated by a plate 19. Located within the lower section 14 are a plurality of piezoelectric cylinders 20 which may be made of barium titanate. Positioned between the piezoelectric cylinders 20 is a detector 21. Conducting means 22 and 23 are provided for transmitting an alternating current to the cylinders 20. Conductors 24 and 25 are connected to the detecting means 21 at terminals 26 and 27 for conducting to the amplifying system 28 located in the upper section 13 of housing 10 electrical signals which are responsive to impinging reflected acoustic waves.

In operation a signal of constant frequency is applied through conductors 22 and 23 to the piezoelectric cylinders 20 thereby causing the cyclic expansion and contraction of the cylinders 20. The sound waves generated from cylinders 20 are reflected by the various subsurface formations in borehole 11 and after reflection, impinge upon the detector 21. The detector 21 expands and contracts in response to the impinging reflected waves and generates an alternating signal which is conducted through conductors 24 and 25 to the amplifying system 28. After the signal has been amplified by means of my new amplifying system, the amplified signal is fed through conductor 29 and cable 12 and recorded at the surface of the earth.

In many logging operations and particularly in acoustic impedance logging operations the magnitude of the signal from the detector is small, being quite often less than 1 volt, and the range or variation in amplitude will, therefore, amount to much less than 1 volt. For example, the voltage generated by detector 21 as a result of impinging reflected waves may range from .49 to .50 volt. The noise of cable 12 is such that the variation in signal transmitted to the surface of the earth must be at least a few volts. Hence, it can be seen that if the signals from the detector 21 are directly amplified even as much as one hundred times, the voltage from the detector 21 will range from 49 to 50 volts. The difference in voltage still would be only one volt, which difference or variation is not sufficient to override the noise of the cable 12. Any voltage over 50 would saturate most amplifying tubes which can be utilized in the well logging system. Therefore, a system which provides the amplifying tubes with a voltage of less than 50 volts while having a variation of at least a few volts is necessary.

To overcome the difficulties incurred in direct amplifying systems, I have invented the new amplifying system shown in Fig. 2. As shown in Fig. 2 the leads 24 and 25 from the detector are fed to a conductor 40 and also to a second conductor 41. The signal fed through conductor 41 is conducted to an automatic gain control circuit 42 (shown in dashed lines). The automatic gain control circuit 42 includes therein an electronic tube $V_1$, the transconductance of which varies in response to a change in the magnitude of the signals fed to the grid 60 of electronic tube $V_1$ to produce as an output a signal which is of reverse phase to the signal fed to the grid 60 and of constant maximum amplitude. The output signal of electronic tube $V_1$ is fed through capacitor $C_1$, resistance element $R_1$, conductor 43, and capacitor $C_2$ to the grid 44 of an electronic tube $V_2$. Electronic tube $V_2$ includes within its circuit a grid resistor $R_2$ which is connected to ground potential.

The signal fed through conductor 40 and through capacitor $C_3$ is fed to the grid 45 of a second electronic tube $V_3$. The grid 45 of electronic tube $V_3$ has a resistor $R_3$ which is connected to ground potential. The tubes $V_2$ and $V_3$ shown in Fig. 2 may have a common cathode resistor $R_4$ which is also connected to ground potential. The anodes of the electronic tubes $V_2$ and $V_3$ are connected to a common resistor $R_5$. Hence, it can be seen that the signal produced as an output from the electronic tubes $V_2$ and $V_3$ consists of the addition of the voltage at anode 46 and anode 47, which voltages will be reversed in phase.

The output from the tubes $V_2$ and $V_3$ is conducted through a coupling capacitor $C_4$ to a voltage controlled negative feedback amplifier 48 (encompassed by dashed lines). The voltage controlled negative feedback amplifier 48 includes therein a pentode $V_4$ and a triode $V_5$. The anode or plate of pentode $V_4$ is coupled to the grid of triode $V_5$ by means of a coupling capacitor $C_5$. The signal received at the grid of pentode $V_4$ is amplified by tubes $V_4$ and $V_5$ with the amplified signal being conducted through conductor 50 and coupling capacitor $C_6$ to a rectifying diode $V_6$. A portion of the output from the electronic tube $V_5$ forms part of the input of pentode $V_4$. The portion forming part of the input of $V_4$ is conducted through conductor 50, capacitor $C_9$, resistance element $R_6$, conductor 51 and resistance element $R_7$. The voltage controlled negative feedback amplifier 48 serves to reduce harmonic and phase distortion and also serves to increase the stability of my new electrical circuit. Along with cathode resistance element $R_7$ a bypass capacitor $C_7$ is also included in the cathode circuit of the tube $V_4$. The cathode resistance element $R_8$ and bypass capacitor $C_8$ of triode $V_5$ are connected to ground.

The amplified voltage output from voltage controlled negative feedback amplifier 48, after being rectified by diode $V_6$, is conducted through a filtering system 49 (shown in dashed lines) in order to further filter out any alternating current still remaining within the signal, the resulting direct current being fed to the grid 52 of an electronic tube $V_7$ included in a cathode follower circuit. The output voltage across the cathode resistance element $R_9$ closely follows the change in potential of the grid 52 caused by the direct current flowing to the grid 52. The output from the cathode follower circuit is fed through conductor 53 to the well logging cable 12 and conducted to the surface of the earth where the signal is recorded. Voltage is supplied to the anodes of electronic tubes $V_1$, $V_2$, $V_3$, $V_4$, $V_5$ and $V_7$ by means of a voltage source E.

The alternating signals from the detector 21 usually vary in a range from .49 to .50 volt. This varying signal is fed to the grid of tube $V_3$ and also to the grid 60 of tube $V_1$ included in the automatic gain control system 42. The circuit components of the automatic gain control circuit 42 may be adjusted to maintain a signal of any desired constant amplitude of reversed phase to the original signal. It is only necessary to select the value of the reversed phase signal of constant amplitude so that for all expected variations in the original signal the difference in the voltages of plates 46 and 47 is always of the same polarity. For example, if the circuit components of automatic gain control 42 are adjusted to maintain a constant amplitude signal of .4 volt, this voltage is fed to the grid 44 of electron tube $V_2$. The circuit components of the tubes $V_2$ and $V_3$ may also be adjusted to provide a particular gain. For example, if the gain of tubes $V_2$ and $V_3$ is 10 the voltage across the plate resistance element $R_5$ will vary from 4.9 minus 4 volts to 5 minus 4 volts or from .9 volt to 1 volt. Hence, a 1% variation in original signal conducted through conductors 40 and 41 has been changed to a 10% variation in the output of tubes $V_2$ and $V_3$. The voltage of from .9 to 1.0 volts is presented to the input of the feedback amplifier 48 where the circuit components are adjusted to amplify the received signal. For example, the circuit components may be such as to amplify the received signal 35 times. The amplified signal is rectified by the diode $V_6$ resulting in a varying D.C. voltage which is a measure of the acoustic impedance of the subsurface formations being logged. Hence, the voltage to the cable 12, therefore, varies from 31.5 to 35 volts. The voltage presented to the tube $V_7$ is, therefore, not high enough to cause saturation of tube $V_7$, the saturation point of tube $V_7$ being approximately 50 volts. Also, since the amount of variation of the signal amounts to around 3.5 volts, the variation in voltage through cable 12 is sufficiently high to override the noise of the cable 12.

Hence, it can be seen I have devised a new amplifying system which can be readily utilized to increase the percentage variation of a signal having a small magnitude so that a D.C. signal is developed which has a sufficiently high variation in voltage to permit the D.C. signal to be transmitted over great distances without requiring several amplifying stages.

Though my new amplifying system has been described, in connection with an acoustic impedance logger, it is to be understood that my new amplifying system may be readily utilized with any other type of logging instrument, and for that matter can be utilized for increasing the percentage variation of any signal regardless of its source.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I wish to claim as new and useful and to secure by Letters Patent is:

1. Apparatus for detecting and amplifying small amplitude variations of an alternating current input signal applied to input terminal means thereof, comprising: a summing circuit having first and second input circuits and an output circuit, responsive to signals appearing at said first and second input circuits for producing in said output circuit an electrical signal variable in accordance with the sum of the amplitudes of signals appearing at said first and second input circuits; first coupling circuit means coupling the input terminal means to said first input circuit; a phase-reversing amplifier coupling the input terminal means to said second input circuit for applying to said second input circuit an electrical signal that is 180° out of phase with the signal appearing at said first input circuit; and an automatic signal amplitude controlling circuit connected to the input terminal and to said phase-reversing amplifier, responsive to the input signal applied to the input terminal means to maintain constant the amplitude of the alternating current output signal of said phase-reversing amplifier means.

2. Apparatus for detecting and amplifying amplitude variations of an input signal applied between an input terminal thereof and ground, comprising: a first electric valve including a first plate electrode, a first control electrode, and a first cathode electrode; a second electric valve including a second plate electrode, a second control electrode, and a second cathode electrode; said first plate electrode being directly connected to said second plate electrode, and said first cathode electrode being directly connected to said second cathode electrode; a common resistor connecting said first and second cathode electrodes to ground; a plate potential source connected between ground and said first and second plate electrodes through output impedance means; coupling means directly coupling said input terminal to said first control electrode; a phase-reversing circuit coupling said input terminal to said second control electrode, said phase reversing circuit being responsive to said input signal to produce at said second control electrode a constant amplitude alternating signal of reverse phase relative to the signal appearing at said first control electrode; an automatic signal amplitude controlling circuit connected to said input terminal and to said phase-reversing circuit, responsive to the variations in amplitude of the input signal to maintain constant the amplitude of the output signal of said phase-reversing circuit; and means coupling the signal appearing between said first and second plate electrodes and ground to an output circuit.

References Cited in the file of this patent

UNITED STATES PATENTS

| | | |
|---|---|---|
| 2,251,594 | Mayne | Aug. 5, 1941 |
| 2,283,241 | Van Cott | May 19, 1942 |
| 2,284,102 | Rosencrans | May 26, 1942 |
| 2,383,888 | Price | Aug. 28, 1945 |
| 2,390,409 | Aiken | Dec. 4, 1945 |
| 2,430,246 | Piety | Nov. 4, 1947 |
| 2,450,818 | Vermillion | Oct. 5, 1948 |
| 2,615,999 | Culicetto | Oct. 28, 1952 |
| 2,846,522 | Brown | Aug. 5, 1958 |